United States Patent
Sato (10) Patent No.: US 7,242,535 B2
(45) Date of Patent: Jul. 10, 2007

(54) ZOOM LENS BARREL INCLUDING A ROTATABLE CAM RING

(75) Inventor: Norio Sato, Tokyo (JP)

(73) Assignee: PENTAX Corporation, Tokyo (JP)

( * ) Notice: Subject to any disclaimer, the term of this patent is extended or adjusted under 35 U.S.C. 154(b) by 70 days.

(21) Appl. No.: 11/264,037

(22) Filed: Nov. 2, 2005

(65) Prior Publication Data

US 2006/0098303 A1    May 11, 2006

(30) Foreign Application Priority Data

Nov. 8, 2004    (JP)    ............... 2004-323048

(51) Int. Cl.
*G02B 15/14*    (2006.01)
(52) U.S. Cl. .................................... 359/700
(58) Field of Classification Search ................ 359/694, 359/696, 699–701, 703
See application file for complete search history.

(56) References Cited

U.S. PATENT DOCUMENTS

| | | | |
|---|---|---|---|
| 4,848,884 A * | 7/1989 | Enomoto | ............ 359/700 |
| 6,522,478 B2 | 2/2003 | Nomura et al. | |
| 6,522,482 B2 | 2/2003 | Nomura et al. | |
| 6,873,472 B2 | 3/2005 | Suzuki | |
| 2003/0184877 A1 * | 10/2003 | Kabe | ............ 359/694 |

FOREIGN PATENT DOCUMENTS

| | | |
|---|---|---|
| JP | 2003-185907 | 7/2003 |
| JP | 3573127 | 7/2004 |

* cited by examiner

*Primary Examiner*—Alicia Harrington
(74) *Attorney, Agent, or Firm*—Greenblum & Bernstein, P.L.C.

(57)    ABSTRACT

A zoom lens barrel includes a stationary cylindrical member, a rotatable cam ring and a linearly-guided member concentrically provided in that order from the outside of the zoom lens barrel, a first cam mechanism which is provided between the rotatable cam ring and the linearly-guided member to move the linearly-guided member in an optical axis direction without rotating upon rotation of the rotatable cam ring, and a second cam mechanism provided between the stationary cylindrical member and the rotatable cam ring to move the rotatable cam ring in an optical axis direction upon rotation of the rotatable cam ring. The second cam mechanism causes the rotatable cam ring to rotate while moving in the optical axis direction so that the amount of movement of the rotatable cam ring in the optical axis direction with respect to the angle of rotation thereof is nonlinear.

14 Claims, 7 Drawing Sheets

ZOOM LENS BARREL INCLUDING A ROTATABLE CAM RING

BACKGROUND OF THE INVENTION

1. Field of the Invention

The present invention relates to a zoom lens barrel which includes a rotatable cam ring driven to rotate.

2. Description of the Related Art

In conventional zoom lens barrels, a moving mechanism, provided with a rotatable cam ring driven to rotate and having cam grooves, for linearly moving at least one linearly-guided member (generally a lens support frame), which is positioned radially inside the rotatable cam ring, in an optical axis direction by a rotational force of the rotatable cam ring has been widely adopted. The linearly-guided member is supported so as to be prevented from rotating in order to be capable of moving only linearly in the optical axis direction, and includes cam followers which are respectively engaged in the aforementioned cam grooves of the rotatable cam ring. In the case of such a mechanism having the simplest structure, two sets of cam grooves for moving two lens groups are formed on an inner peripheral surface of the rotatable cam ring while two sets of cam followers on two lens support frames of the two lens groups are engaged in the two sets of cam grooves, respectively, to thereby make it possible to give each of the two lens groups a predetermined zooming path.

The rotatable cam ring used to be rotated simply at a fixed position (i.e., without moving in the optical axis direction), however, in recently-produced zoom lens barrels including a rotatable cam ring, a structure in which the rotatable cam ring is engaged with a stationary ring via helicoids (helicoidal threads) and is rotated while being moved forward and rearward in the optical axis direction has been widely adopted to reduce the length of the zoom lens barrel when retracted. This type of zoom lens barrel is disclosed in Japanese Unexamined Patent Publication 2003-185907.

Nevertheless, in the conventional structure in which the rotatable cam ring rotates at a fixed position, if the length of the rotatable cam ring in the optical axis direction is short, the angle of inclination of each cam groove on the rotatable cam ring with respect to a circumferential direction thereof is great, which causes the rotatable cam ring to require a greater rotational force for rotating the rotatable cam ring. In addition, even in the conventional structure in which the rotatable cam ring moves forward and rearward in the optical axis direction while rotating via helicoids, the inclination of each cam groove on the rotatable cam ring with respect to a circumferential direction thereof is also great. Accordingly, such conventional structures, in which the inclination of each cam groove on the rotatable cam ring with respect to a circumferential direction thereof is great, narrows the degree of design flexibility of the zoom lens barrel and unnecessarily requires the rotatable cam ring to be long in length and have a long movement range.

SUMMARY OF THE INVENTION

The present invention provides a zoom lens barrel having a rotatable cam ring in which a zooming mechanism can be constructed so that the rotatable cam ring does not rotate at a fixed position nor rotate while moving forward and rearward at a uniform speed in the optical axis direction in order to perform a zooming operation.

According to an aspect of the present invention, a zoom lens barrel is provided, including a stationary cylindrical member, a rotatable cam ring and a linearly-guided member concentrically provided in that order from the outside of the zoom lens barrel, a first cam mechanism which is provided between the rotatable cam ring and the linearly-guided member to move the linearly-guided member in an optical axis direction without rotating upon rotation of the rotatable cam ring, and a second cam mechanism provided between the stationary cylindrical member and the rotatable cam ring to move the rotatable cam ring in an optical axis direction upon rotation of the rotatable cam ring. The second cam mechanism causes the rotatable cam ring to rotate while moving in the optical axis direction so that the amount of movement of the rotatable cam ring in the optical axis direction with respect to the angle of rotation thereof becomes nonlinear.

It is desirable for the first cam mechanism to cause the linearly-guided member to move in the optical axis direction upon rotation of the rotatable cam ring so that the amount of movement of the linearly-guided member in the optical axis direction with respect to the angle of rotation of the rotatable cam ring is nonlinear.

It is desirable for the first cam mechanism to include at least one cam groove provided in the rotatable cam ring, and at least one first cam follower projecting from an outer peripheral surface of the linearly-guided member to be engaged in the cam groove so that a rotation of the rotatable cam ring causes the linearly-guided member to move linearly in the optical axis direction via engagement of the cam groove with the first cam follower.

It is desirable for the rotatable cam ring to be provided with a spur gear on an outer peripheral surface thereof which is mesh with a pinion gear driven to rotate the rotatable cam ring.

It is desirable for the rotatable cam ring to be provided with the spur gear at the rear side thereof, wherein the second cam mechanism includes at least one second cam follower and at least one nonlinear cam groove which are respectively formed on one and the other of a front portion of the outer peripheral surface of the rotatable cam ring and an inner peripheral surface of the stationary cylindrical to be engaged with each other.

It is desirable for the nonlinear cam groove to be formed on a front portion of the inner peripheral surface of the stationary cylindrical, and for a rear portion of the inner peripheral surface of the stationary cylindrical member to include an opening through which the spur gear is exposed radially outwards to be engaged with the pinion gear.

It is desirable for the pinion gear to be supported by the stationary cylindrical member to be freely rotatable.

It is desirable for the nonlinear cam groove to be formed on the stationary cylindrical member. The zoom lens barrel can include at least one linear guide groove, formed on the stationary cylindrical member behind the nonlinear cam groove in the optical axis direction, for linearly guiding the linearly-guided member in the optical axis direction.

It is desirable for the nonlinear cam groove to include an accommodating section which includes only a circumferential component; a first advancing section for advancing the rotatable cam ring; a retracting section for retracting the rotatable cam ring, a direction of inclination of the retracting section with respect to a circumferential direction about the optical axis being opposite to that of the first advancing section; and a second advancing section for advancing the rotatable cam ring again, in that order.

It is desirable for the rotatable cam ring to be extended and retracted from and into the stationary cylindrical member when rotated forward and reverse, respectively.

It is desirable for the zoom lens barrel to include a front movable lens group and a rear movable lens group which are moved in the optical axis direction to perform a zooming operation, wherein the linearly-guided member supports the front movable lens group.

It is desirable for the pinion gear to be freely rotatable on an axis extending parallel to the optical axis.

It is desirable for the pinion gear to have a sufficient axial length to be capable of remaining engaged with the spur gear over the entire range of movement of the rotatable cam ring the optical axis direction.

In an embodiment, a zoom lens barrel is provided, including a stationary cylindrical member; a rotatable cam ring provided inside the stationary cylindrical member; a linearly-guided member provided inside the rotatable cam ring and guided linearly in an optical axis direction without rotating, wherein a rotation of the rotatable cam ring causes the linearly-guided member to move linearly in the optical axis direction; and at least one cam follower and at least one nonlinear cam groove which are respectively formed on one and the other of the outer peripheral surface of the rotatable cam ring and an inner peripheral surface of the stationary cylindrical to be engaged with each other. When the rotatable cam ring is driven to rotate, the rotatable cam ring rotates while moving in the optical axis direction via engagement of the cam follower with the nonlinear cam groove so that the amount of movement of the rotatable cam ring in the optical axis direction with respect to the angle of rotation thereof is nonlinear.

According to the present invention, a zoom lens barrel is achieved wherein a rotatable cam ring in which a zooming mechanism can be constructed so that the rotatable cam ring does not rotate at a fixed position, but rotates while moving forward and rearward in the optical axis direction at a non-uniform speed (i.e., nonlinear movement) in order to perform a zooming operation.

The present disclosure relates to subject matter contained in Japanese Patent Application No. 2004-323048 (filed on Nov. 8, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

FIGS. 1 through 6 show a first embodiment of a zoom lens barrel according to the present invention which is designed for a digital camera. The overall structure of the zoom lens barrel 10 will be discussed hereinafter.

Figure 1:
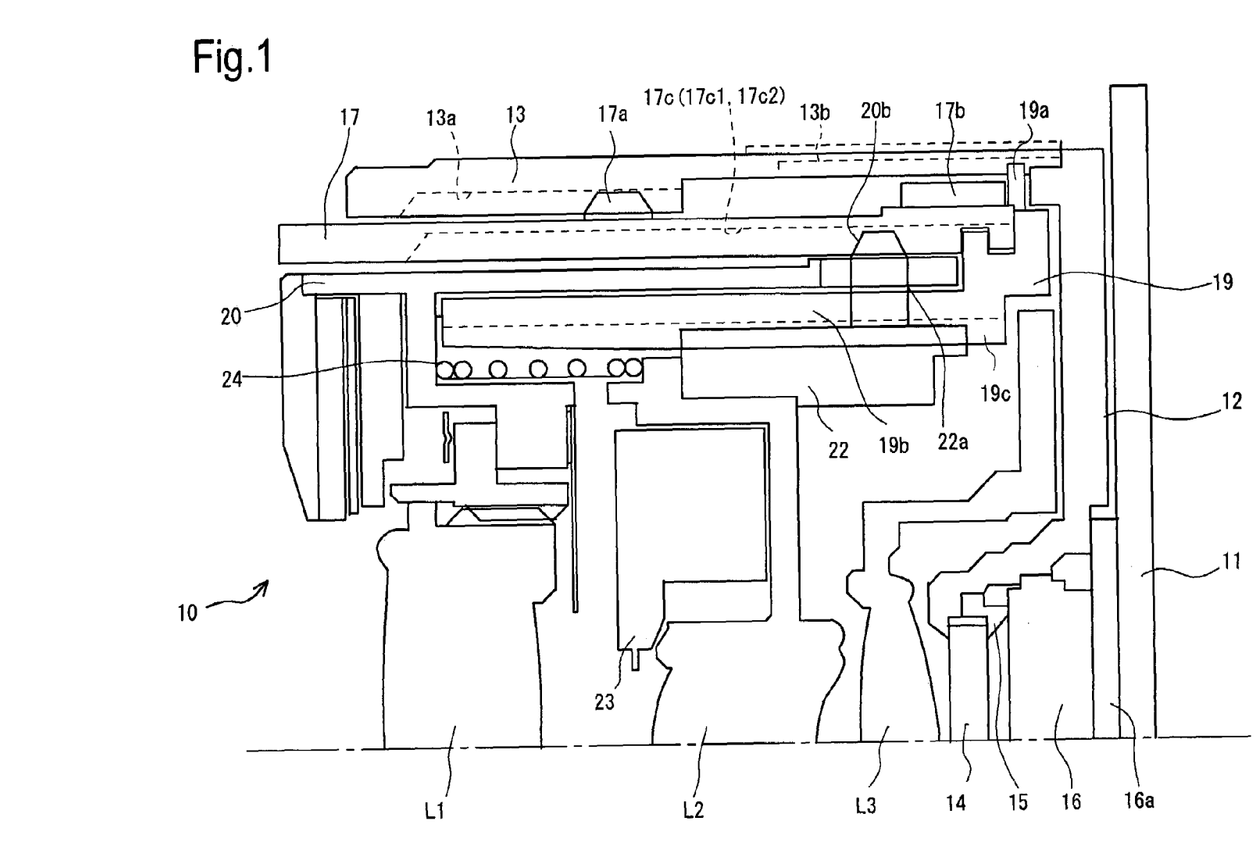
FIG. 1 is a longitudinal sectional view of a first embodiment of a zoom lens barrel according to the present invention, showing only an upper half of the zoom lens barrel from the optical axis thereof in an accommodated state (fully-retracted state) of the zoom lens barrel.
Figure 2:
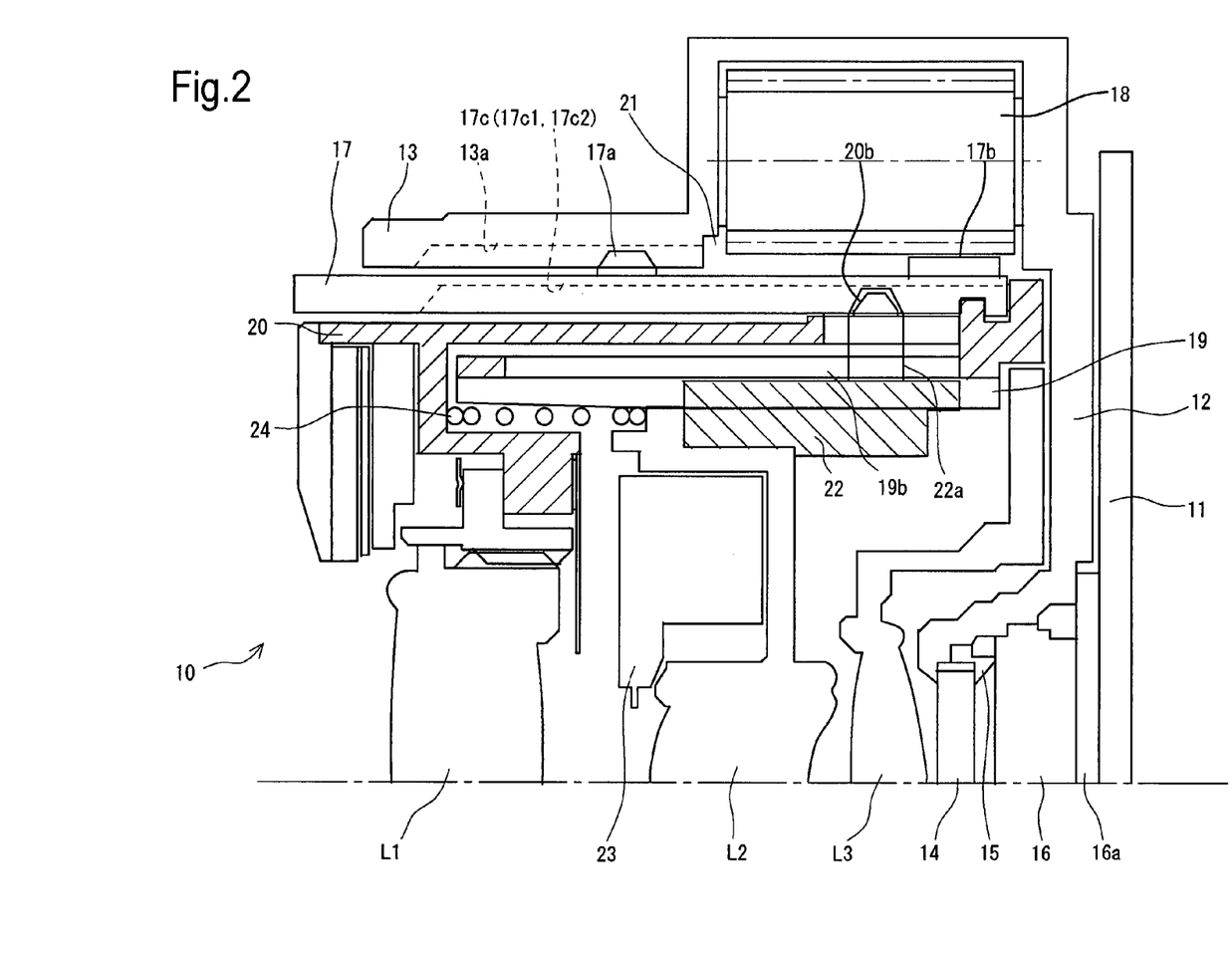
FIG. 2 is a longitudinal sectional view of the zoom lens barrel shown in FIG. 1, taken along a different plane to show gear portions of the zoom lens barrel, showing only an upper half of the zoom lens barrel from the optical axis thereof in the accommodated state of the zoom lens barrel.
Figure 3:
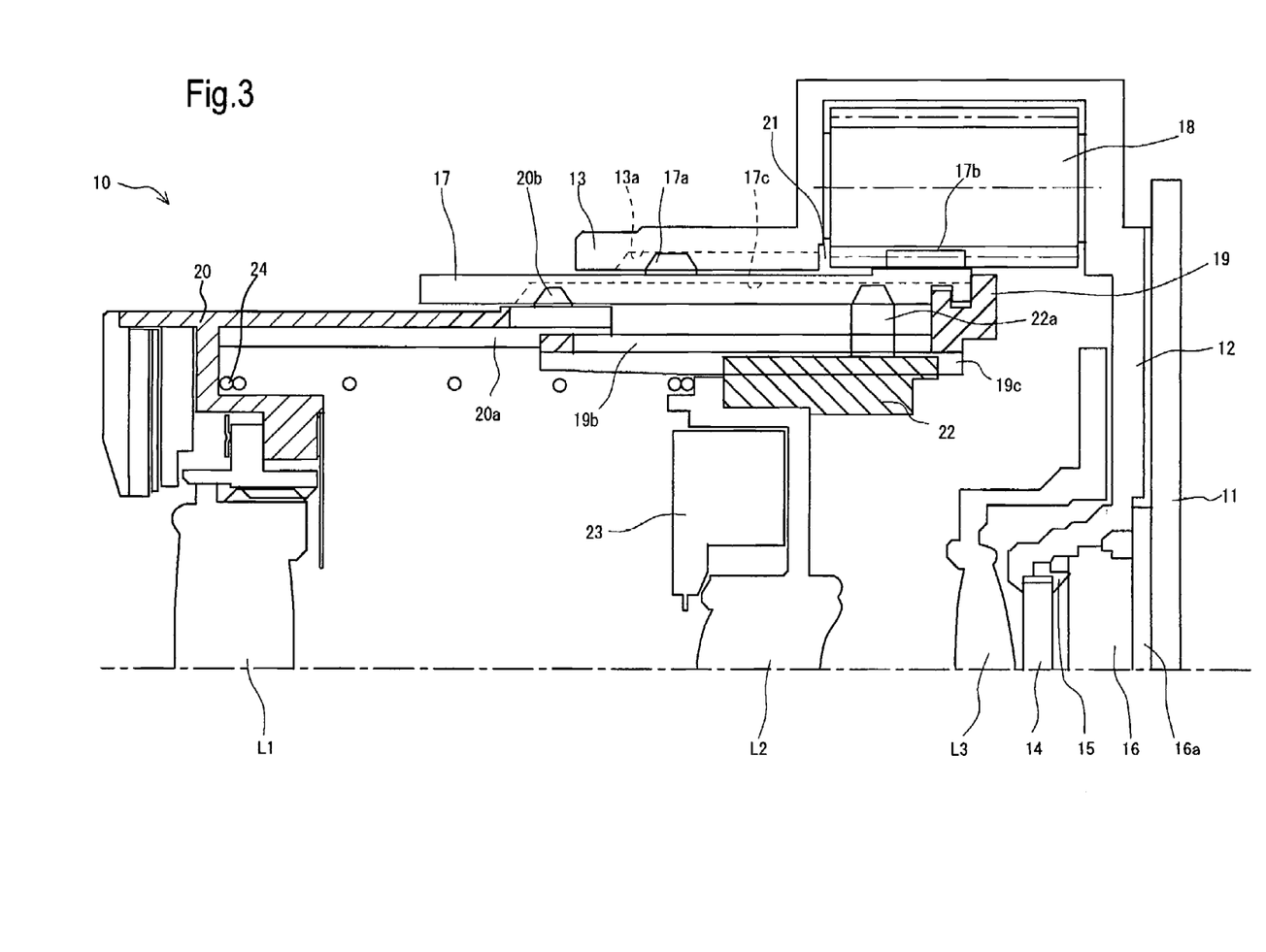
FIG. 3 is a longitudinal sectional view of the zoom lens barrel shown in FIG. 1, taken along the same plane as that of FIG. 2, showing only an upper half of the zoom lens barrel from the optical axis thereof when the zoom lens barrel is set at the wide-angle extremity.
Figure 4:
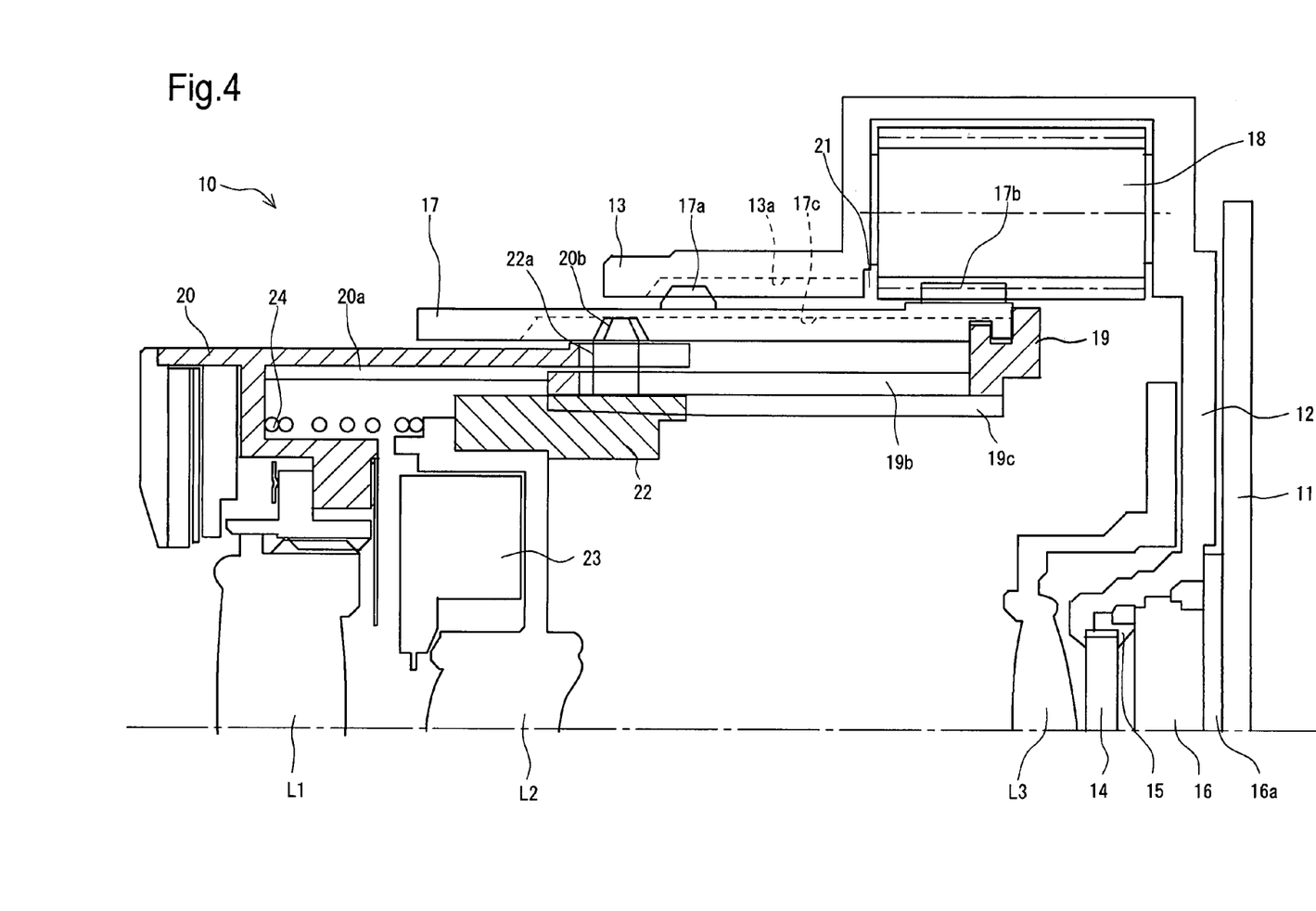
FIG. 4 is a longitudinal sectional view of the zoom lens barrel shown in FIG. 1, taken along the same plane as that of FIG. 2, showing only an upper half of the zoom lens barrel from the optical axis thereof when the zoom lens barrel is set at the telephoto extremity.

The zoom lens barrel 10 is provided at the back thereof with a main board 11, and is further provided with a stationary cylindrical member 13 and a CCD substrate 16a which are fixed to the main board 11. The zoom lens barrel 10 is provided in front of the main board 11 with a CCD fixing member 12. The zoom lens barrel 10 is provided between the CCD substrate 16a and the CCD fixing member 12 with a low-pass optical filter 14, a sealing member 15 and a CCD image sensor 16, in that order from the front side (left side as shown in FIGS. 1 through 3) of the zoom lens barrel 10, which are fixed to the CCD substrate 16a by the CCD fixing member 12. All the above described elements of the zoom lens barrel 10 are fixed elements which are immovable during a zooming operation of the zoom lens barrel 10.

Figure 5:
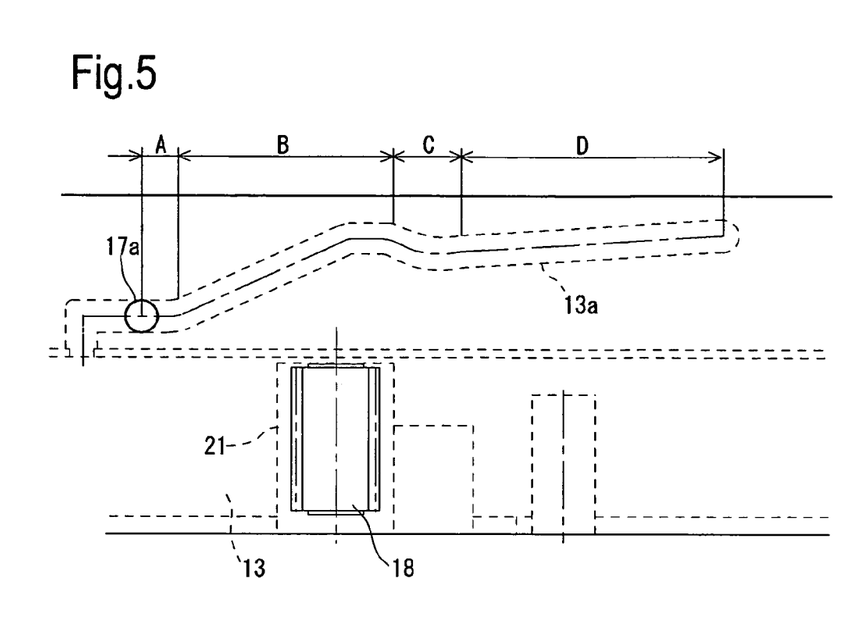
FIG. 5 is a developed view of a stationary cylindrical member of the zoom lens barrel shown in FIGS. 1 through 4 in relation to a pinion gear and a cam follower of the rotatable cam ring.

The zoom lens barrel 10 is provided with a plurality of ring members (barrel members), and among these ring members the stationary cylindrical member 13 is the radially outermost ring member. The stationary cylindrical member 13 is provided on an inner peripheral surface thereof with a plurality of nonlinear cam grooves (stationary cam grooves) 13a (generally three nonlinear cam grooves 13a arranged at equi-angular intervals) and a plurality of linear guide grooves 13b (see FIG. 1) extending in a direction parallel to a photographing optical axis O. Only one of the plurality of nonlinear cam grooves 13a is shown in FIG. 5. Each nonlinear cam groove 13a is provided with an accommodating section A, a first advancing section B, a retracting section C and a second advancing section D in that order as shown in FIG. 5. The accommodating section A includes only a circumferential component, while each of the first advancing section B, the retracting section C and the second advancing section D includes both a predetermined circumferential component and a predetermined axial component (see FIG. 5). The direction of the axial component of the retracting section C is reverse to those of the first advancing section B and the second advancing section D.

The zoom lens barrel 10 is provided radially inside of the stationary cylindrical member 13 with a rotatable cam ring 17 positioned coaxially with the stationary cylindrical member 13 to be freely rotatable about the photographing optical axis O. The rotatable cam ring 17 is provided on an outer peripheral surface thereof with a plurality of cam followers 17a which project radially outwards to be engaged in the plurality of nonlinear cam grooves 13a of the stationary cylindrical member 13, respectively. The rotatable cam ring 17 is provided, on an outer peripheral surface thereof in the vicinity of the rear end of the rotatable cam ring 17, with a spur gear 17b. A pinion gear 18 (see FIGS. 2 through 5) which is rotatably supported by the stationary cylindrical member 13 to be driven forward and reverse is in mesh with the spur gear 17b. An axis of the pinion gear 18 on which the pinion gear 18 rotates extends parallel to the photographing optical axis O. The spur gear 17b is exposed radially outwards through an opening (radial opening) 21 formed on a rear portion of the stationary cylindrical member 13 to be engaged with the pinion gear 18. The pinion gear 18 has a sufficient axial length to be capable of remaining engaged with the spur gear 17b over the entire range of movement of the rotatable cam ring 17 in the optical axis direction. The zoom lens barrel 10 is provided radially inside the rotatable cam ring 17 with a linear guide ring 19 which is concentrically connected to the rotatable cam ring 17 to move together with the rotatable cam ring 17 in the optical axis direction while allowing the rotatable cam ring 17 to rotate freely about the optical axis O relative to the linear guide ring 19.

The linear guide ring 19 is provided with a plurality of linear guide projections 19a (only one of which is shown in FIG. 1) which project radially outwards to be engaged in the plurality of linear guide grooves 13b of the stationary cylindrical member 13, respectively. Due to this engagement of the plurality of linear guide projections 19a with the plurality of linear guide grooves 13b, rotating the pinion gear 18 forward and reverse causes the rotatable cam ring 17 to rotate forward and reverse via the spur gear 17b, thus causing the rotatable cam ring 17 to move forward and rearward in the optical axis direction in accordance with the engagement of the plurality of cam followers 17a with the plurality of nonlinear cam grooves 13a. At the same time, the linear guide ring 19 moves together with the rotatable cam ring 17 in the optical axis direction while the rotatable cam ring 17 rotates relative to the linear guide ring 19.

Figure 6:
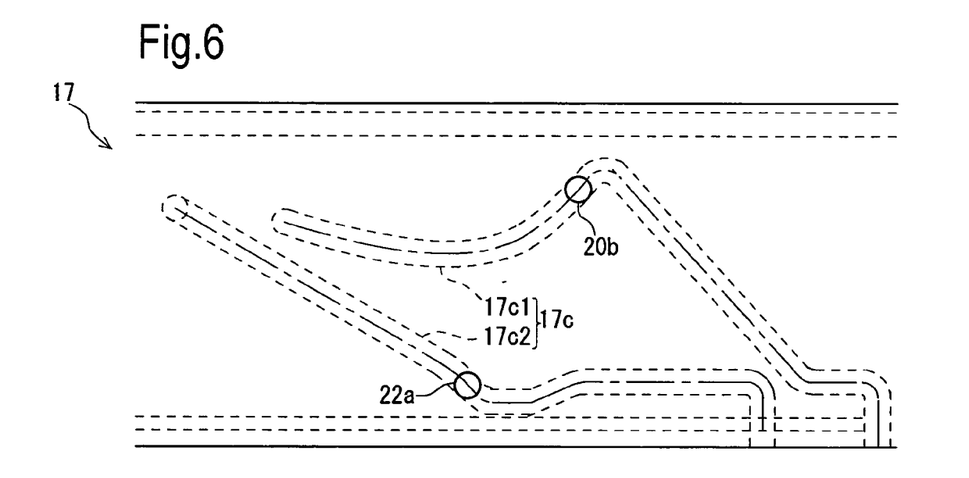
FIG. 6 is a developed view of the rotatable cam ring of the zoom lens barrel shown in FIGS. 1 through 4.

The rotatable cam ring 17 is provided on an inner peripheral surface thereof with a plurality of cam grooves 17c which consist of a plurality of first-lens-group driving cam grooves 17c1 (generally three first-lens-group driving cam grooves 17c1 arranged at equi-angular intervals; only one of them is shown in FIG. 6) and a plurality of second-lens-group driving cam grooves 17c2 (generally three second-lens-group driving cam grooves 17c2 arranged at equi-angular intervals; only one of them is shown in FIG. 6). The zoom lens barrel 10 is provided between the rotatable cam ring 17 and the linear guide ring 19 with a cylindrical first lens group support frame (linearly-guided member) 20 for supporting a first lens group L1. The first lens group support frame 20 is guided linearly in the optical axis direction by linear guide elements 19b and 20a of a linear guide mechanism provided between the linear guide ring 19 and the first lens group support frame 20. The first lens group support frame 20 is provided on an outer peripheral surface thereof with a plurality of cam followers 20b which are engaged in the plurality of first-lens-group driving cam grooves 17c1 of the rotatable cam ring 17, respectively. Forward and reverse rotations of the rotatable cam ring 17 cause the first lens group support frame 20 to move forward and rearward linearly in the optical axis direction, respectively, in accordance with contours of the plurality of first-lens-group driving cam grooves 17c1.

The zoom lens barrel 10 is provided radially inside the linear guide ring 19 with a second lens group support frame 22 for supporting a second lens group L2. The linear guide ring 19 is provided on an inner peripheral surface thereof with a plurality of linear guide grooves 19c extending parallel to the optical axis O, and the second lens group support frame 22 is slidably engaged in the plurality of linear guide grooves 19c to be guided linearly in the optical axis direction. The zoom lens barrel 10 is provided with a shutter unit 23, and both the second lens group L2 and the shutter unit 23 are fixed to the second lens group support frame 22. The second lens group support frame 22 is provided on an outer peripheral surface thereof with a plurality of cam followers 22a which are engaged in the plurality of second-lens-group driving cam grooves 17c2 of the rotatable cam ring 17, respectively. Forward and reverse rotations of the rotatable cam ring 17 cause the second lens group support frame 22 to move forward and rearward linearly in the optical axis direction, respectively, in accordance with contours of the plurality of second-lens-group driving cam grooves 17c2. The zoom lens barrel 10 is provided between the first lens group support frame 20 and the second lens group support frame 22 with a compression coil spring 24 having a truncated conical shape which biases the first lens group support frame 20 and the second lens group support frame 22 in directions away from each other in the optical axis direction to remove backlash between the plurality of first-lens-group driving cam grooves 17c1 and the plurality of cam followers 20b and backlash between the plurality of second-lens-group driving cam grooves 17c2 and the plurality of cam followers 22a.

Figure 7:
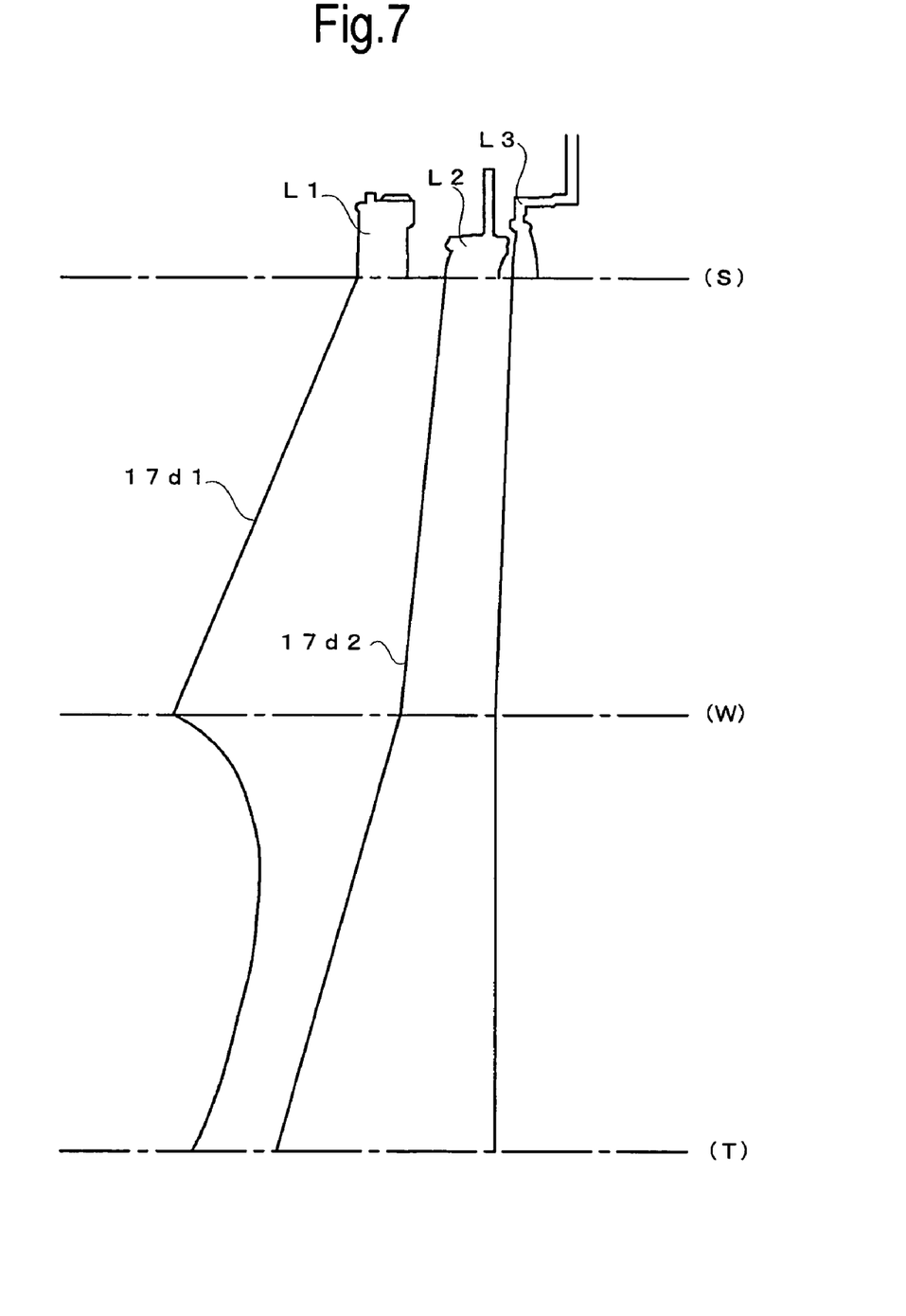
FIG. 7 is a diagram showing two predetermined zooming paths of a first lens group and a second lens group of the zoom lens barrel shown in FIGS. 1 through 4, respectively.

The contour of each first-lens-group driving cam groove 17c1 is determined to give the first lens group support frame 20 a predetermined zooming path 17d1 (see FIG. 7) by the resultant cam action of the plurality of first-lens-group driving cam grooves 17c1 and the plurality of nonlinear cam grooves 13a, while the contour of each second-lens-group driving cam groove 17c2 is determined to give the second lens group support frame 22 a predetermined zooming path 17d2 (see FIG. 7) by the resultant cam action of the plurality of second-lens-group driving cam grooves 17c2 and the plurality of nonlinear cam grooves 13a. FIG. 7 shows the zooming paths 17d1 and 17d2 of the first lens group L1 and the second lens group L2, respectively. The letters "S", "W" and "T" shown in FIG. 7 represent the accommodated position (fully retracted position), the wide-angle extremity and the telephoto extremity, respectively.

Hence, the plurality of cam followers 20b, 22a and the plurality of first-lens-group driving cam grooves 17c1, 17c2 constitute a first cam mechanism of the zoom lens barrel, and the plurality of cam followers 17a and the plurality of nonlinear cam grooves 13a constitute a second cam mechanism of the zoom lens barrel.

A third lens group L3, which is positioned behind the second lens group L2, serves as a focusing lens group which is driven in the optical axis direction by a drive mechanism (not shown) to perform a focusing operation in accordance with object distance information.

A series of operations of the zoom lens barrel 10 that has the above described structure from the accommodated position to the telephoto extremity will be discussed. In the zoom lens barrel 10, driving the pinion gear 18 forward and reverse causes the rotatable cam ring 17 to rotate forward and reverse via the spur gear 17b. The rotatable cam ring 17 only rotates when the plurality of cam followers 17a are engaged in the accommodating sections A of the plurality of nonlinear cam grooves 13a of the stationary cylindrical member 13, respectively. Rotation of the rotatable cam ring 17 in the forward rotation direction from this position moves each of the first lens group support frame 20 (the first lens group L1) and the second lens group support frame 22 (the second lens group L2) from the accommodated position to the wide-angle extremity (a ready-to-photograph position) in accordance with contours of the plurality of first-lens-group driving cam grooves 17c1 and the plurality of second-lens-group driving cam grooves 17c2, respectively.

Upon the plurality of cam followers 17a entering into the first advancing sections B of the plurality of nonlinear cam grooves 13a, respectively, the rotatable cam ring 17 moves forward in the optical axis direction while rotating in the forward rotation direction. Subsequently, upon the plurality of cam followers 17a entering into the retracting sections C of the plurality of nonlinear cam grooves 13a, respectively, the rotatable cam ring 17 moves rearward while rotating in the forward rotation direction. Subsequently, upon the plurality of cam followers 17a entering into the second advancing sections D of the plurality of nonlinear cam grooves 13a, respectively, the rotatable cam ring 17 resumes moving forward while rotating in the forward rotation direction. These forward and rearward movements of the rotatable cam ring 17 cause the first lens group support frame 20 and the second lens group support frame 22 to move forward and rearward in the optical axis direction in a moving pattern like that represented by the zooming paths 17d1 and 17d2 shown in FIG. 7, in accordance with a combined cam path obtained from the plurality of nonlinear cam grooves 13a and the plurality of first-lens-group driving cam grooves 17c1 and a combined cam path obtained from the plurality of nonlinear cam grooves 13a and the plurality of second-lens-group driving cam grooves 17c2, respectively. In addition, a series of operations of the zoom lens barrel 10 from the telephoto extremity back to the accommodated position are performed by the operations of the rotatable cam ring 17 and the first lens group support frame 20 wherein the rotatable cam ring 17 and the first lens group support frame 20 move forward and rearward while rotating in the reverse direction in accordance with contours of the four sections A, B, C and D.

An important aspect of the above described embodiment of the zoom lens barrel resides in that the rotatable cam ring 17 rotates while moving in the optical axis direction in a manner so that the amount of movement of the rotatable cam ring 17 in the optical axis direction with respect to the angle of rotation thereof is nonlinear (i.e., the rotatable cam ring 17 rotates while moving in the optical axis direction at a non-uniform speed). Specifically, the rotatable cam ring 17 moves forward and rearward by a rotation of the rotatable cam ring 17 in the same rotation direction in accordance with contours of the plurality of nonlinear cam grooves 13a in the illustrated embodiment of the zoom lens barrel. This makes it possible to reduce the axial length of the stationary cylindrical member 13 to thereby miniaturize the stationary cylindrical member 13, which increases the degree of flexibility in the design of the zoom lens barrel. Generally, the first lens group support frame 20 and the second lens group support frame 22 can be moved more smoothly by forming the plurality of cam grooves 17c and the plurality of non-linear cam grooves 13a in a manner to make the directions of inclination of the plurality of cam grooves 17c and the plurality of nonlinear cam grooves 13a closer to each other (to make these two directions coincident with each other).

The shape of each cam groove formed on the rotatable cam ring 17 is only one example of a large number of possibilities. The shapes of each nonlinear cam groove 13a and each rotatable cam groove 17C are determined by the zooming paths 17d1 and 17d2 shown in FIG. 7.

Figure 8:
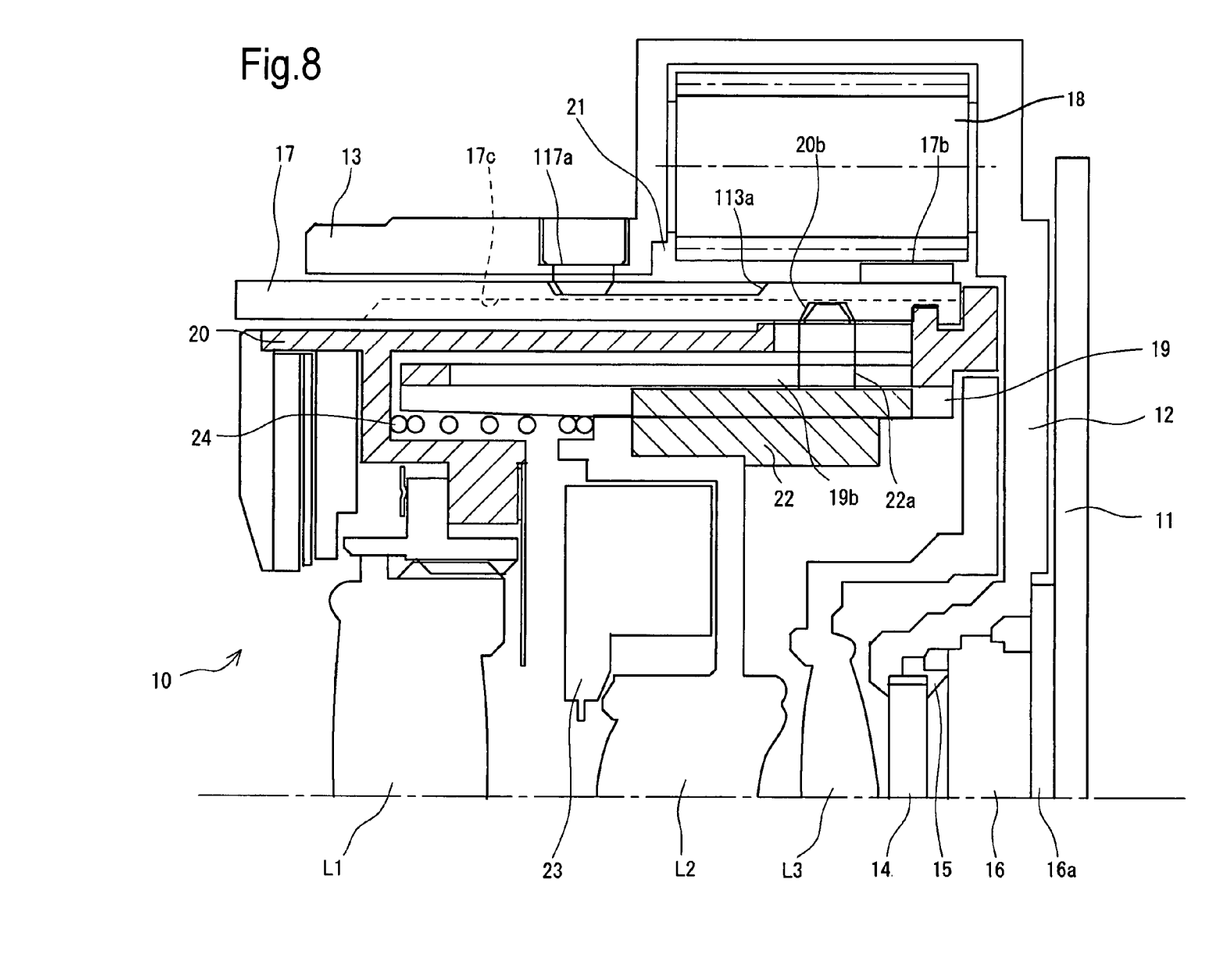
FIG. 8 is a view similar to that of FIG. 2, showing a second embodiment of the zoom lens barrel according to the present invention, showing only an upper half of the zoom lens barrel from the optical axis thereof in an accommodated state (fully-retracted state) of the zoom lens barrel.

FIG. 8 shows a second embodiment of the zoom lens barrel according to the present invention. The relationship between cam followers of the rotatable cam ring and non-linear cam grooves of the stationary cylindrical member in the second embodiment of the zoom lens barrel is the reverse of that in the first embodiment of the zoom lens barrel. Specifically, in the second embodiment of the zoom lens barrel, the rotatable cam ring 17 is provided on an outer peripheral surface thereof with a plurality of nonlinear cam grooves 113a corresponding to the plurality of nonlinear cam grooves 13a (instead of the plurality of cam followers 17a), while the stationary cylindrical member 13 is provided on an inner peripheral surface thereof with a plurality of cam followers 117a corresponding to the plurality of cam followers 17a (instead of the plurality of nonlinear cam grooves 13a) which are engaged in the plurality of nonlinear cam grooves 113a, respectively. Except for this difference, the second embodiment of the zoom lens barrel has the same structure as the first embodiment of the zoom lens barrel, and obtains the same effect as the first embodiment of the zoom lens barrel.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens barrel comprising:
   a stationary cylindrical member, a rotatable cam ring and a linearly-guided member concentrically provided in that order from the outside of the zoom lens barrel;
   a first cam mechanism which is provided between said rotatable cam ring and said linearly-guided member to move said linearly-guided member in an optical axis direction without rotating upon rotation of said rotatable cam ring; and
   a second cam mechanism provided between said stationary cylindrical member and said rotatable cam ring to move said rotatable cam ring in an optical axis direction upon rotation of said rotatable cam ring,
   wherein said second cam mechanism causes said rotatable cam ring to rotate while moving in the optical axis direction so that the amount of movement of said rotatable cam ring in said optical axis direction with respect to the angle of rotation thereof is nonlinear.

2. The zoom lens barrel according to claim 1, wherein said first cam mechanism causes said linearly-guided member to move in the optical axis direction upon rotation of said rotatable cam ring so that the amount of movement of said linearly-guided member in the optical axis direction with respect to the angle of rotation of the rotatable cam ring is nonlinear.

3. The zoom lens barrel according to claim 2, wherein said first cam mechanism comprises:
   at least one cam groove provided in said rotatable cam ring; and
   at least one first cam follower projecting from an outer peripheral surface of said linearly-guided member to be engaged in said cam groove so that a rotation of said rotatable cam ring causes said linearly-guided member to move linearly in said optical axis direction via engagement of said cam groove with said first cam follower.

4. The zoom lens barrel according to claim 3, wherein said rotatable cam ring is provided with said spur gear at the rear side thereof, wherein said second cam mechanism comprises at least one second cam follower and at least one nonlinear cam groove which are respectively formed on one and the other of a front portion of said outer peripheral surface of said rotatable cam ring and an inner peripheral surface of said stationary cylindrical to be engaged with each other.

5. The zoom lens barrel according to claim 4, wherein said nonlinear cam groove comprises:
   an accommodating section which includes only a circumferential component;
   a first advancing section for advancing said rotatable cam ring;
   a retracting section for retracting said rotatable cam ring, a direction of inclination of said retracting section with respect to a circumferential direction about said optical axis being opposite to that of said first advancing section; and
   a second advancing section for advancing said rotatable cam ring again, in that order.

6. The zoom lens barrel according to claim 5, wherein said rotatable cam ring is extended and retracted from and into said stationary cylindrical member when rotated forward and reverse, respectively.

7. The zoom lens barrel according to claim 1, wherein said rotatable cam ring is provided with a spur gear on an outer peripheral surface thereof which is mesh with a pinion gear driven to rotate the rotatable cam ring.

8. The zoom lens barrel according to claim 7, wherein said nonlinear cam groove is formed on a front portion of said inner peripheral surface of said stationary cylindrical, and
   wherein a rear portion of said inner peripheral surface of said stationary cylindrical member includes an opening through which said spur gear is exposed radially outwards to be engaged with said pinion gear.

9. The zoom lens barrel according to claim 7, wherein said pinion gear is supported by said stationary cylindrical member to be freely rotatable.

10. The zoom lens barrel according to claim 9, wherein said pinion gear is freely rotatable on an axis extending parallel to said optical axis.

11. The zoom lens barrel according to claim 7, wherein said pinion gear has a sufficient axial length to be capable of remaining engaged with said spur gear over the entire range of movement of said rotatable cam ring said optical axis direction.

12. The zoom lens barrel according to claim 1, wherein said nonlinear cam groove is formed on said stationary cylindrical member, and
   wherein said zoom lens barrel further comprises at least one linear guide groove, formed on said stationary cylindrical member behind said nonlinear cam groove in said optical axis direction, for linearly guiding said linearly-guided member in said optical axis direction.

13. The zoom lens barrel according to claim 1, further comprising a front movable lens group and a rear movable lens group which are moved in said optical axis direction to perform a zooming operation,
   wherein said linearly-guided member supports said front movable lens group.

14. A zoom lens barrel comprising:
   a stationary cylindrical member;
   a rotatable cam ring provided inside said stationary cylindrical member;
   a linearly-guided member provided inside said rotatable cam ring and guided linearly in an optical axis direction without rotating, wherein a rotation of said rotatable cam ring causes said linearly-guided member to move linearly in said optical axis direction; and
   at least one cam follower and at least one nonlinear cam groove which are respectively formed on one and the other of said outer peripheral surface of said rotatable cam ring and an inner peripheral surface of said stationary cylindrical to be engaged with each other,
   wherein, when said rotatable cam ring is driven to rotate, said rotatable cam ring rotates while moving in said optical axis direction via engagement of said cam follower with said nonlinear cam groove so that the amount of movement of said rotatable cam ring in said optical axis direction with respect to the angle of rotation thereof is nonlinear.

* * * * *